(12) United States Patent
Dobbins et al.

(10) Patent No.: US 7,970,930 B2
(45) Date of Patent: Jun. 28, 2011

(54) COMMUNICATIONS SYSTEM AND METHOD TO CONTROL AND MANAGE BOTH SESSION-BASED AND NON-SESSION-BASED APPLICATION SERVICES

(75) Inventors: Kurt A. Dobbins, Bedford, NH (US); Brett A. Miller, Northborough, MA (US)

(73) Assignee: Ellacoya Networks, Inc., Merrimack, NH (US)

( * ) Notice: Subject to any disclaimer, the term of this patent is extended or adjusted under 35 U.S.C. 154(b) by 1019 days.

(21) Appl. No.: 11/810,393

(22) Filed: Jun. 5, 2007

(65) Prior Publication Data
US 2008/0307081 A1 Dec. 11, 2008

(51) Int. Cl.
G06F 13/00 (2006.01)

(52) U.S. Cl. ....................................................... 709/238
(58) Field of Classification Search .................. 209/238
See application file for complete search history.

(56) References Cited

U.S. PATENT DOCUMENTS

| | | | |
|---|---|---|---|
| 7,145,994 B2 | 12/2006 | Moreau et al. | |
| 2004/0109455 A1* | 6/2004 | Jouppi et al. | 370/395.52 |
| 2006/0168303 A1 | 7/2006 | Oyama et al. | |
| 2006/0234674 A1 | 10/2006 | Koskinen et al. | |
| 2007/0008963 A1 | 1/2007 | Hoffmann | |

OTHER PUBLICATIONS

Iván Vidal, Jaime García, Francisco Valera, Ignacio Soto, and Arturo Azcorra, "Adaptive Quality of Service Management for Next Generation Residential Gateways", Universidad Carlos III de Madrid, Avda. Universidad 30, 28911 Leganes—Madrid, Spain.
(Student) Rahadian Dewantoro, Dipl-Inf. Andreas Reifert, Dipl-Ing. Michael Scharf, "IP Multimedia Subsystem (IMS) snd Its Comparison with Different Systems", Seminar in High Performance Network Architecture (HPNA) Institute of Communication Networks and Computer Engineering (IKR) University of Stuttgart Germany 2005.
Lucent Technologies, "Lucent IMS and RACF Overview", pp. 1-13.
Pertti Raatikainen, "Next Generation Network (NGN) and Reliability", VTT Technical Research Centre of Finland, © VTT.

* cited by examiner

Primary Examiner — Robert B Harrell
(74) Attorney, Agent, or Firm — Houston Eliseeva, LLP (57) ABSTRACT

A system and method that enables session-based and non-session-based application services to be controlled and managed within the IMS/NGN architecture. The IMS/NGN architecture includes a service layer and a transport layer. IMS service control functions are implemented within the service layer, and RACF and transport functions are implemented within the transport layer. The transport functions include access and core network functions, which have corresponding QoS resources. The access or core network function includes an application service control function (ASCF), which includes a PD-FE and a functional element for inspecting packet data flows, and identifying and classifying application services associated with the flows. The ASCF is employed to signal the IMS service control functions on behalf of non-session-based application services, and to reserve and allocate the QoS resources needed to support packet data flows associated with the non-session-based services. As a result, service providers can provide users or subscribers of such non-session-based services with guaranteed or differentiated QoS and/or differentiated service plans, thereby allowing charges to be calculated for the non-session-based services and service plans that are commensurate with the value of the respective service or plan.

30 Claims, 9 Drawing Sheets

COMMUNICATIONS SYSTEM AND METHOD TO CONTROL AND MANAGE BOTH SESSION-BASED AND NON-SESSION-BASED APPLICATION SERVICES

CROSS REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates generally to an IP multimedia subsystem (IMS) and next generation network (NGN), and more specifically to a communications system and method that conforms with the IMS/NGN architecture and incorporates an application service control function operative to integrate, control, and manage both session-based and non-session-based application services.

The IP multimedia subsystem (IMS) is a communications standard defined by the third generation partnership project (3GPP) that was originally developed to integrate services provided over cellular networks and the Internet. The development of IMS fostered the creation of the next generation network (NGN), which encompasses communications network architectures and technologies defined by the Telecommunication Standardization Sector of the International Telecommunication Union (ITU-T). NGN is configured not only to integrate, control, and manage services provided over various types of communications networks, e.g., voice, data, video, and wireless networks, but also to provide blended services that allow significant interaction between the disparate voice, data, video, and wireless services.

The IMS/NGN architecture includes a service layer and a transport layer. IMS is implemented within the service layer, and comprises three primary service control functions, namely, a call session control function (CSCF), a home subscriber server (HSS), and an application server (AS). The CSCF is configured to perform session initiation protocol (SIP) call control signal processing. In general, the CSCF includes three types of SIP routing engines, namely, a proxy-CSCF (P-CSCF), an interrogating-CSCF (I-CSCF), and a session-CSCF (S-CSCF), which are operative to perform session signaling and control, and policy management and enforcement for NGN. The HSS includes at least one database containing user profile information, which can be accessed by the CSCF to authenticate and authorize users to receive requested application services. The AS is configured to host and execute the requested services. A resource and admission control function (RACF) and transport functions are implemented within the transport layer. The transport functions comprise access and core network functions, both of which can include quality of service (QoS) resources. The RACF couples the IMS service control functions with the QoS resources within the access and core network functions to control QoS over the respective networks via, for example, the reservation of resources, and admission and gate control.

A goal of NGN is to integrate, control, and manage application services provided over all types of communications networks such as voice, data, video, and wireless networks, etc. For example, NGN can control and manage a voice-over-IP (VoIP) application service using SIP call control signaling as follows. First, at a user terminal, a SIP INVITE message is sent to the CSCF in the service layer of NGN to request the VoIP service. Next, the CSCF communicates with the HSS to authenticate and authorize the user to receive the requested service. If the user is successfully authenticated/authorized, then the CSCF communicates with the AS to begin setting up a VoIP call. The CSCF then sends a message to the RACF in the transport layer of NGN to request the QoS resources required for the VoIP call. Next, the RACF communicates with the access network function to determine whether the requested resources are available, and, if so, to reserve and allocate the resources. The RACF then determines whether sufficient bandwidth is available on the access and core networks, and possibly one or more other networks, to allow a VoIP packet data flow to be established from the user terminal to a destination terminal. If sufficient bandwidth is available, then the RACF communicates with the access and core network functions to reserve and allocate the necessary bandwidth, and to perform other functions such as QoS marking, policing, priority handling, etc., for the VoIP flow. If the destination terminal is located within the network of another service provider, then the RACF can also communicate with a border gateway to perform QoS functions such as QoS marking, policing, priority handling, etc., at the network interface. Because such QoS marking, policing, priority handling, etc., can be performed on a "per application" and "per user" basis, guaranteed or differentiated QoS and/or differentiated service plans can be provided for NGN, thereby allowing charges for the sessions providing the respective services and plans to be calculated accordingly. It is noted that the generation of charging records within the IMS/NGN architecture is typically performed by the CSCF in the service layer.

One drawback of the above-described communications system is that it fails to make accommodations for application services that are not controlled using SIP call control signaling, and therefore do not require a session to be established to provide the respective service. Such non-session-based application services include audio/video streaming, peer-to-peer (P2P) telephony, P2P file sharing, P2P video streaming, and web content downloading. In general, service providers cannot provide non-session-based services with guaranteed or differentiated QoS, and instead typically provide such services as best-effort flows for application services that are not controlled using SIP call control signaling, even though a majority of multimedia applications do not explicitly signal using SIP or other resource control signaling mechanisms. Therefore, while a predominate amount of multimedia sessions are established in IMS and NGN networks without any session control signaling, they lack the service guarantees or differentiated QoS often needed for multimedia applications, such as P2P telephony or P2P video streaming.

In addition, it can be difficult at best for service providers to calculate charges for non-session-based application services that are commensurate with the value of the respective service. In some cases, application services may employ SIP call control signaling, but they may not be configured to signal to the IMS/NGN resource control elements within the network to which they are directly connected. Essentially, these application services fall outside the signaling domain of the network provider, but they may require multimedia services. Without a mechanism within the network to perform call control functions for these non-provider based SIP-compliant application services, they too will lack the service guarantees or differentiated QoS often needed for multimedia applications. The failure of the above-described communications system to make accommodations for such non-session-based services may also delay the widespread adoption of NGN services.

It would therefore be desirable to have a system and method that can be employed within the IMS/NGN architecture to enable the integration, control, and management of both session-based and non-session-based application services, while avoiding the drawbacks of conventional communications systems that conform with the IMS/NGN architecture.

BRIEF SUMMARY OF THE INVENTION

In accordance with the present invention, a system and method is provided that enables both session-based and non-session-based application services to be controlled and managed in a communications system that conforms with the IMS/NGN architecture. The presently disclosed system and method can be employed to control and manage non-session-based services with or without signaling the IMS service control functions. In the context of the present invention, session-based application services correspond to application services that are compliant with the session initiation protocol (SIP), and non-session-based application services correspond to non-SIP-compliant application services.

In one embodiment, the presently disclosed system and method is employed within the IMS/NGN architecture, which includes a service layer and a transport layer. IMS is implemented within the service layer, and comprises three primary service control functions, namely, a call session control function (CSCF), a home subscriber server (HSS), and an application server (AS). A resource and admission control function (RACF) and transport functions are implemented within the transport layer. The RACF includes a policy decision functional element (PD-FE), and a transport resource control functional element (TRCF). A policy server can also be implemented within the transport layer. For example, the policy server can be included in the RACF, or can be implemented within the transport layer as a functional element external to the RACF. The transport functions comprise access and core network functions, both of which have corresponding quality of service (QoS) resources. For example, the access network function can include a policy enforcement functional element (PEF), and a TRCF. In the presently disclosed embodiment, the access network function further includes an application service control function (ASCF), which can include a PD-FE and a functional element for inspecting packet data flows, and for identifying and classifying application services associated with the packet data flows. In an alternative embodiment, the ASCF can be included in the core network function.

As discussed above, the presently disclosed system and method can be employed within the IMS/NGN architecture to control and manage non-session-based application services with or without signaling the IMS service control functions. In one mode of operation, the disclosed system signals the IMS service control functions to provide the non-session-based service as follows. For example, the non-session-based service can correspond to a peer-to-peer (P2P) telephony service. At a user terminal, a packet data flow for the P2P telephony service is sent to the transport functions within the transport layer of NGN. Next, the ASCF included in the access network function inspects the packet data flow to identify and classify the application service associated with the flow. For example, the ASCF can employ pattern matching, application level gateways, decryption, behavioral analysis, and/or any other suitable mechanism or technique for inspecting the packet data flow to identify and classify the associated application service. After the application service has been successfully identified and classified as a P2P telephony service, the ASCF communicates with the CSCF, which subsequently communicates with the HSS to authenticate and authorize the user of the P2P telephony service. If the user is successfully authenticated/authorized, then the CSCF sends a message to the PD-FE included in the RACF to request the QoS resources required for the P2P telephony call. Because the non-session-based application service has been successfully identified and classified as a P2P telephony service, and the user of the non-session-based service has been successfully authenticated/authorized, the QoS of the non-session-based service can be controlled and managed on both a "per application" and a "per user" basis. In an alternative embodiment, the ASCF can communicate directly with the PD-FE included in the RACF to request the required resources. Next, the PD-FE included in the RACF communicates with the TRCF included in the access network function to reserve and allocate the resources in the access network needed to support the P2P telephony flow. The PD-FE included in the RACF then communicates with the PEF included in the access network function to perform QoS and policy enforcement functions such as QoS marking, policing, priority handling, etc., for the P2P telephony flow. If the destination terminal is located within the network of another service provider, then the PD-FE included in the RACF can also communicate with a PEF included in a border gateway to perform QoS marking, policing, priority handling, etc., at the network interface. In this way, the presently disclosed system and method can be employed within the IMS/NGN architecture to provide guaranteed or differentiated QoS and/or differentiated service plans for non-session-based application services.

In another mode of operation, the presently disclosed system and method can be employed within the IMS/NGN architecture to control and manage a non-session-based application service without signaling the IMS service control functions as follows. In this second mode of operation, the non-session-based service can again correspond to a non-session-based P2P telephony application service. At a user terminal, a packet data flow for the P2P telephony service is sent to the transport functions within the transport layer of NGN. Next, the ASCF included in the access network function inspects the packet data flow to identify and classify the application service associated with the flow. Like the first mode of operation described above, this second mode of operation can employ, at the ASCF, pattern matching, application level gateways, decryption, behavioral analysis, and/or any other suitable mechanism or technique for inspecting the packet data flow to identify and classify the associated application service. After the application service has been successfully identified and classified as a P2P telephony service, the PD-FE included in the ASCF communicates with the TRCF included in the access network function to reserve and allocate the QoS resources in the access network needed to support the P2P telephony flow. The PD-FE included in the ASCF then communicates with the PEF included in the access network function to perform QoS functions such as QoS marking, policing, priority handling, etc., for the P2P telephony flow. In this way, the presently disclosed system and method can be employed within the IMS/NGN architecture to provide guaranteed or differentiated QoS and/or differentiated service plans for non-session-based application services without signaling the IMS service control functions.

By incorporating an application service control function (ASCF) as part of the transport functions within the transport layer of NGN, the ASCF can be employed to signal the IMS service control functions in real-time on behalf of non-session-based application services, and to reserve and allocate the quality of service (QoS) resources needed to support packet data flows associated with the non-session-based services. As a result, service providers can provide users of such non-session-based services with guaranteed or differentiated QoS and/or differentiated service plans, thereby allowing the service providers to calculate charges for the non-session-based services and service plans that are commensurate with the value of the respective service or plan.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIG. 1b is a block diagram of a detailed view of the IMS/NGN architecture of FIG. 1a;

FIGS. 3a-3e are a flow diagram of a method of controlling and managing session-based and non-session-based application services within the IMS/NGN architecture of FIG. 2a.

DETAILED DESCRIPTION OF THE INVENTION

A system and method is disclosed for enabling the integration, control, and management of both session-based and non-session-based application services in a communications system that conforms with the IMS/NGN architecture. The presently disclosed system and method can be employed within the IMS/NGN architecture to control and manage non-session-based services with or without signaling the IMS service control functions.

Figure 1A:
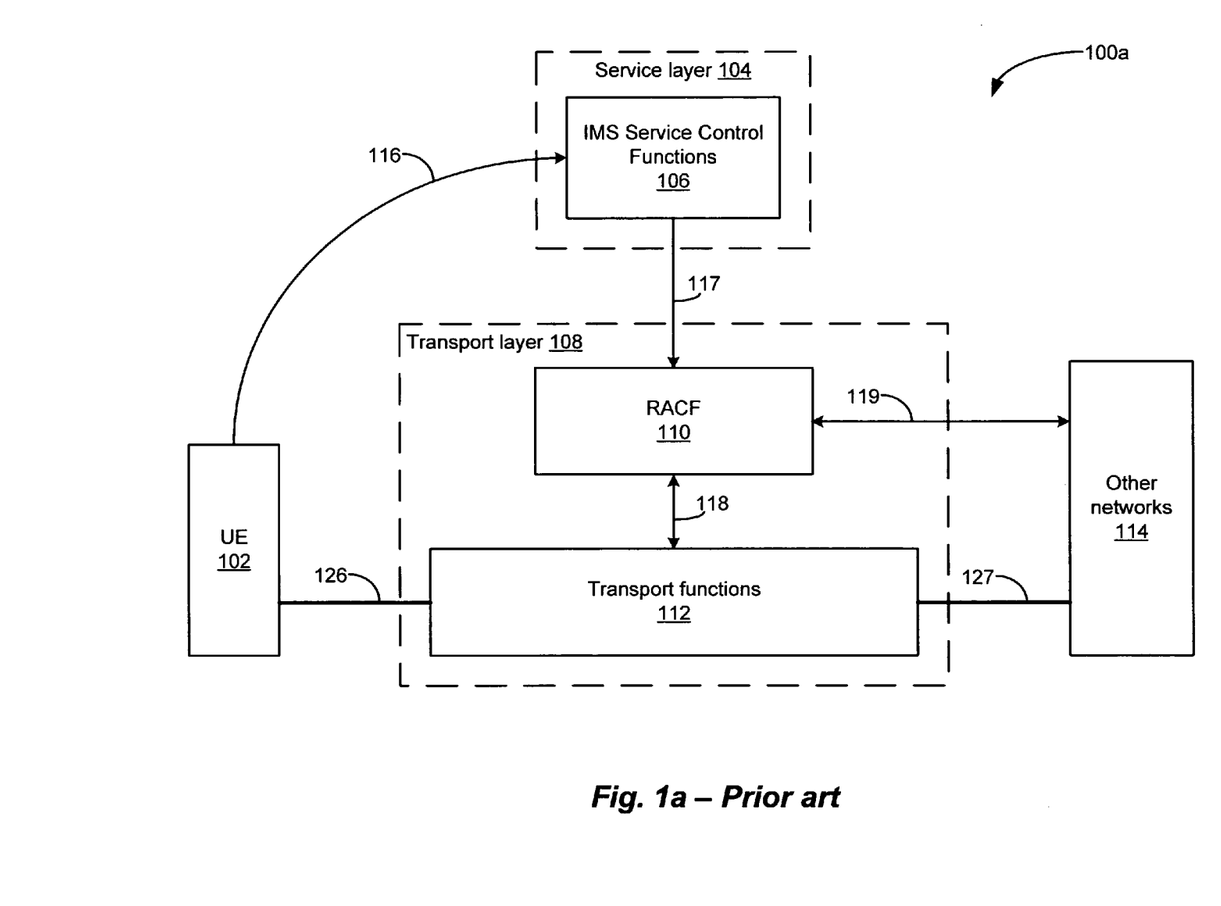
FIG. 1a is a block diagram of the functional architecture of the next generation network (NGN), including IP multimedia subsystem (IMS) service control functions for controlling and managing session-based application services.

FIG. 1a depicts the functional architecture 100a of the next generation network (NGN), including IP multimedia subsystem (IMS) service control functions 106 for controlling and managing session-based application services. The IMS/NGN architecture 100a includes a service layer 104 and a transport layer 108. The IMS service control functions 106 are implemented within the service layer 104, and a resource and admission control function (RACF) 110 and transport functions 112 are implemented within the transport layer 108. As shown in FIG. 1a, user equipment (UE) 102 such as a user terminal is configured to signal the IMS service control functions 106 over a communications path 116 in the control plane of the IMS/NGN architecture 100a to request a desired application service. Within the IMS/NGN architecture 100a, the UE 102 employs the session initiation protocol (SIP) to signal the IMS service control functions 106 over the path 116 to request a session-based application service. For example, the requested session-based service may be a voice over Internet protocol (VoIP) service, an Internet protocol television (IPTV) service, a video on demand (VoD) service, or any other suitable type of session-based service. Next, the IMS service control functions 106 send a message to the RACF 110 over a communications path 117 in the control plane to request the quality of service (QoS) resources required for the desired session-based service. For example, the IMS service control functions 106 may employ the DIAMETER protocol over the path 117 to perform the authentication and authorization functions needed to enable the IMS service control functions 106 to request the QoS resources from the RACF 110.

Next, the RACF 110 communicates with the transport functions 112 over a communications path 118 in the control plane to determine whether the requested resources are available, and, if so, to reserve and allocate the necessary resources. For example, the RACF 110 and the transport functions 112 may employ the common open policy services (COPS) protocol, the DIAMETER protocol, the H.248 protocol, or any other suitable protocol over the path 118 to transfer operator-specific policy rules between policy decision functional elements (PD-FEs), policy enforcement functional elements (PEF), and transport resource control functional elements (TRCF) within the RACF 110 and the transport functions 112. The RACF 110 may also communicate over a communications path 119 with at least one PEF included in at least one border gateway to one or more other networks 114, thereby transferring the operator-specific policy rules between the QoS resources within the RACF 110 and the border gateway. In this way, QoS functions such as QoS marking, policing, priority handling, etc., can be performed for packet data flows associated with the requested session-based service both in the transport layer of the IMS/NGN architecture 100a and at the interface to the other networks 114.

Figure 1B:
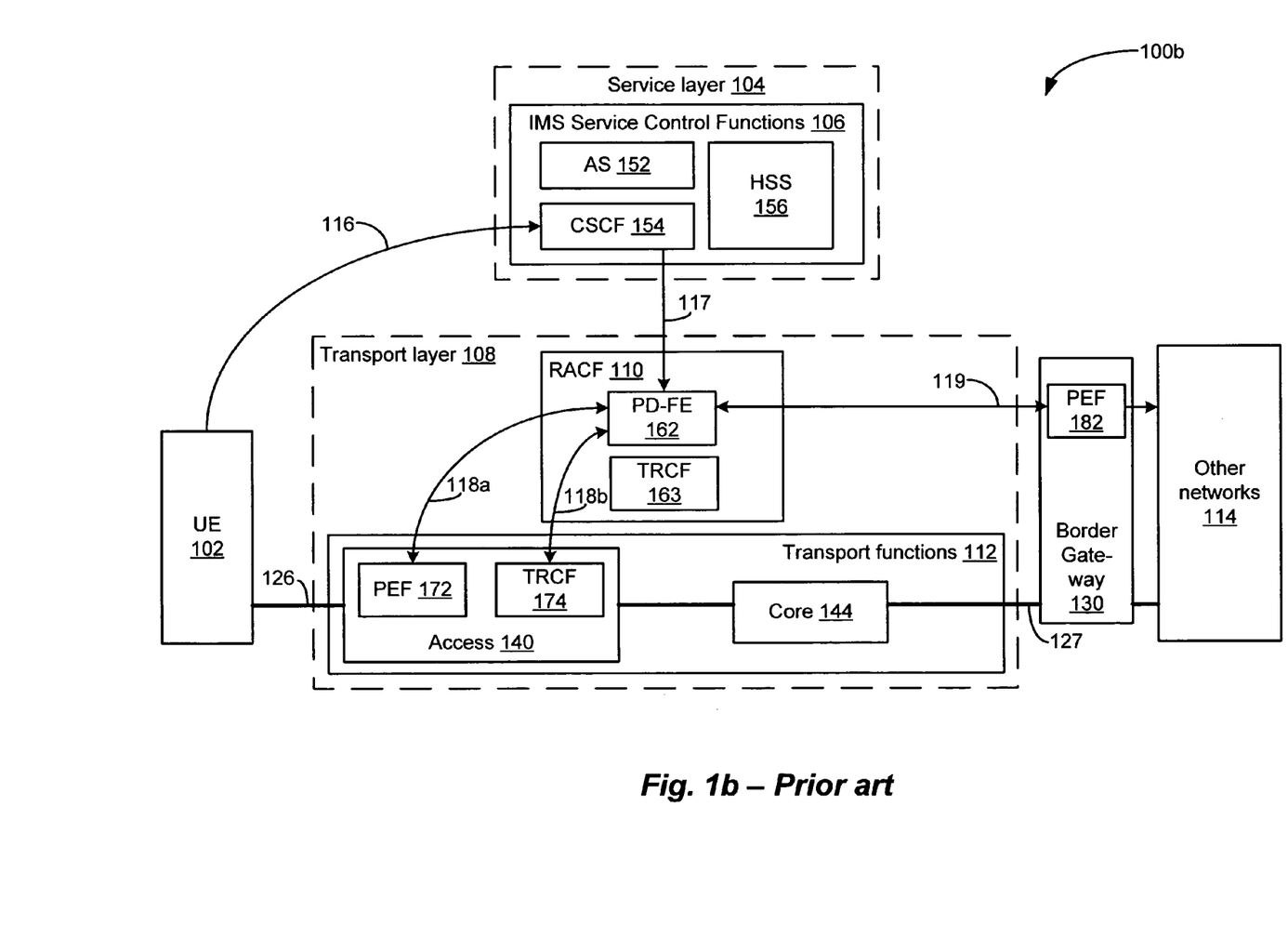

FIG. 1b depicts a detailed view 100b of the IMS/NGN architecture 100a of FIG. 1a. As shown in FIG. 1b, the IMS/NGN architecture 100b includes the service layer 104 and the transport layer 108. The service layer 104 comprises the IMS service control functions 106, which include a call session control function (CSCF) 154, a home subscriber server (HSS) 156, and an application server (AS) 152. The CSCF 154 generally includes three types of session initialization protocol (SIP) routing engines (not shown), namely, a proxy-CSCF (P-CSCF), an interrogating-CSCF (I-CSCF), and a session-CSCF (S-CSCF), which are operative to perform session signaling and control, and policy management and enforcement for NGN call control signaling. The HSS 156 includes at least one database containing user profile information, which can be accessed by the CSCF 154 to authenticate and authorize users to receive requested services. The RACF 110 and the transport functions 112 are implemented within the transport layer 108. The RACF 110 includes a PD-FE 162 and a TRCF 163. The transport functions 112 comprise access and core network functions 140, 144, both of which can include quality of service (QoS) resources. As shown in FIG. 1b, the access network function 140 includes a PEF 172 and a TRCF 174. The RACF 110 couples the IMS service control functions 106 with the QoS resources within the access and core network functions 140, 144 to control QoS over the respective networks via, for example, the reservation of resources, and admission and gate control. The IMS service control functions 106 interact with the transport functions 112 to establish media bearer channels for call controls that are signaled to the IMS call signal functions. In general, the transport resource control functions do not act on their own to establish resources and QoS; they typically require signaling from the service layer 104.

In a typical mode of operation, the functional elements of the IMS/NGN architecture 100b may be employed to control and manage a requested session-based application service such as a VoIP application service using SIP call control signaling as follows. First, at the UE 102 (the "user terminal"), a SIP INVITE message is sent to the CSCF 154 over the path 116 to request the VoIP service. Next, the CSCF 154 communicates with the HSS 156 to authenticate and authorize the user to receive the requested VoIP service. If the user is successfully authenticated/authorized, then the CSCF 154 communicates with the AS 152 to begin setting up a VoIP call. The CSCF 154 then sends a message to the PD-FE 162 included in the RACF 110 to request the QoS resources required for the VoIP call. Next, the PD-FE 162 communicates with the TRCF 174 included in the access network function 140 to reserve and allocate the resources in the access network needed to support the VoIP packet data flow. After the resources are reserved and allocated, a media bearer channel is established over communication paths 126-127 in the media plane of the IMS/NGN architecture 100b, thereby establishing an end-to-end connection for the session between the user terminal and a destination terminal. For example, the real-time transport protocol (RTP) or the RTP control protocol (RTCP) may be employed to transport real-time media such as VoIP over the paths 126-127. The PD-FE 162 then communicates with the PEF 172 included in the access network function 140 to perform QoS and policy enforcement functions such as QoS marking, policing, priority handling, etc., for the VoIP flow over the media bearer channel. If the destination terminal is located within one of the other networks 114, then the PD-FE 162 can also communicate with a PEF 182 included in a border gateway 130 over a communications path 119 to perform QoS marking, policing, priority handling, etc., for the VoIP flow at the network interface.

In this way, the IMS/NGN architecture 100b can be employed to provide guaranteed or differentiated QoS and/or differentiated service plans for session-based application services such as VoIP. One drawback of conventional communications systems that conform with the IMS/NGN architecture 100b is that they fail to make accommodations for the provision of non-session-based application services, i.e., application services that are not compliant with the session initiation protocol (SIP).

Figure 2A:
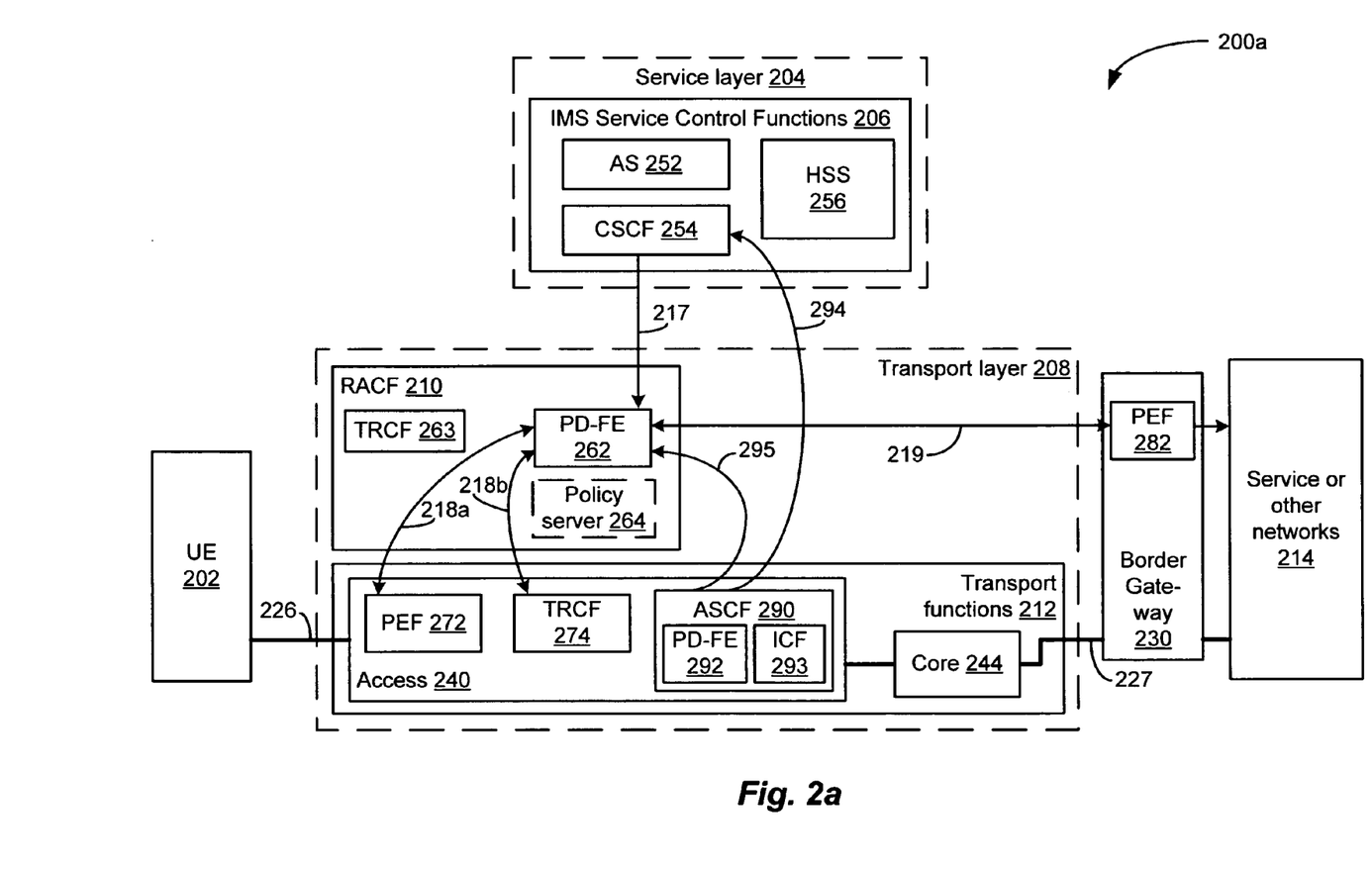
FIG. 2a is a block diagram of the functional architecture of NGN including IMS and application service control functions for controlling and managing both session-based and non-session-based application services, according to the present invention.

FIG. 2a depicts an illustrative embodiment of the functional architecture 200a of NGN, including IMS and application service control functions configured to control and manage both session-based and non-session-based application services, in accordance with the present invention. In the illustrated embodiment, the IMS/NGN architecture 200a includes a service layer 204 and a transport layer 208. The IMS service control functions 206, which are implemented within the service layer 204, include the three primary service control functions, namely, the call session control function (CSCF) 254, the home subscriber server (HSS) 256, and the application server (AS) 252. A resource and admission control function (RACF) 210 and transport functions 212 are implemented within the transport layer 208. The RACF 210 includes a policy decision functional element (PD-FE) 262, and a transport resource control functional element (TRCF) 263. A policy server 264 can also be implemented within the transport layer 208. For example, the policy server 264 can be included in the RACF 210. Alternatively, the policy server 264 can be implemented within the transport layer 208 as a functional element external to the RACF 210. The transport functions 212 include access and core network functions 240, 244, both of which can have corresponding quality of service (QoS) resources. For example, the access network function 240 can include a PEF 272 and a TRCF 274. As shown in FIG. 2a, the access network function 240 further includes an application service control function (ASCF) 290, which can include a PD-FE 292 and an identification classification functional element 293 (ICF) for inspecting packet data flows, and identifying and classifying application services associated with the packet data flows. In an alternative embodiment, the ASCF 290 can be included in the core network function 244.

Like communications systems that conform with the IMS/NGN architecture 100b (see FIG. 1b), communications systems that conform with the IMS/NGN architecture 200a (see FIG. 2a) can be employed to control and manage session-based application services such as voice over Internet protocol (VoIP), Internet protocol television (IPTV), video on demand (VoD), etc. In accordance with the present invention, communications systems that conform with the IMS/NGN architecture 200a can also be employed to control and manage non-session-based application services, with or without signaling the IMS service control functions 206. For example, the non-session-based application services may include a peer-to-peer (P2P) telephony service, an audio/video streaming service, a P2P file sharing service, a web content downloading service, and/or any other suitable type of non-session-based service.

Figure 2B:
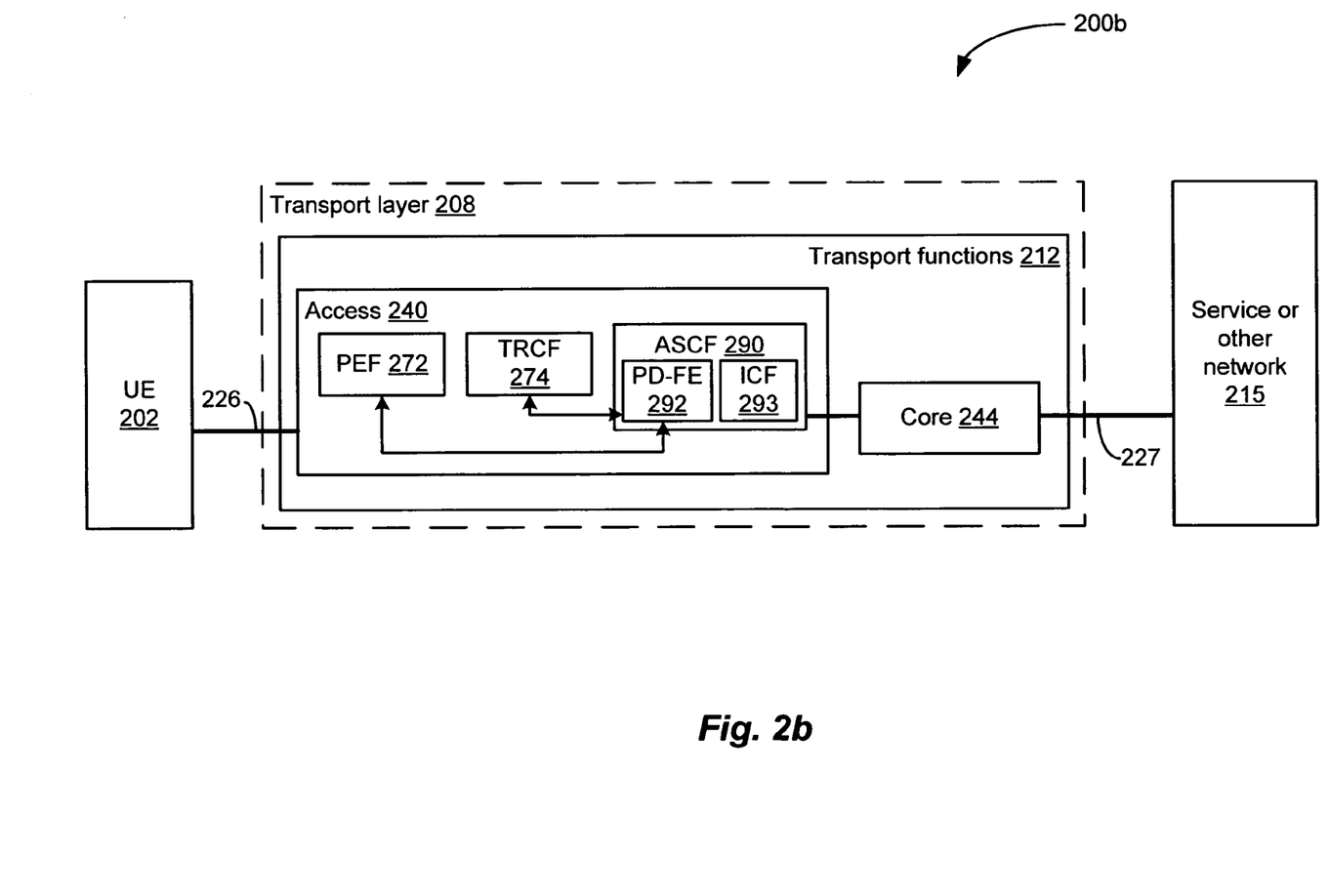
FIG. 2b is a block diagram of an alternative embodiment of the functional architecture of NGN including an application service control function for controlling and managing non-session-based application services, according to the present invention.

The presently disclosed system and method for enabling the integration, control, and management of session-based and non-session-based application services within an IMS/NGN architecture will be better understood with reference to the following illustrative examples and FIGS. 2a-2b. In a first example, a communications system that conforms with the IMS/NGN architecture 200a (see FIG. 2a) is employed to control and manage a non-session-based application service such as a P2P telephony service, including signaling the IMS service control functions 206 on behalf of the non-session-based service. At a UE 202 (the "user terminal"), a packet data flow for the P2P telephony service is sent over a communications path 226 to the transport functions 212 within the transport layer 208. In this case, no call control signaling from the UE 202 is performed. Next, the ASCF 290 included in the access network function 240 inspects the packet data flow to identify and classify the application service associated with the flow. For example, the ASCF 290 can employ pattern matching, application level gateways, decryption, behavioral analysis, and/or any other suitable mechanism or technique for inspecting the packet data flow to identify and classify the associated application service. After the application service has been successfully identified and classified as a P2P telephony service, the ASCF 290 communicates with the CSCF 254 in the service layer 204, which subsequently communicates with the HSS 256 to authenticate and authorize the user of the P2P telephony service. If the user is successfully authenticated/authorized, then the CSCF 254 sends a message to the PD-FE 262 included in the RACF 210 in the transport layer 208 to request the QoS resources required for the P2P telephony call. Because the non-session-based application service has been successfully identified and classified as a P2P telephony service, and the user of the non-session-based service has been successfully authenticated/authorized, the QoS of this non-session-based service can be controlled and managed on both a "per application" and a "per user" basis. In an alternative embodiment, the ASCF 290 can communicate directly with the PD-FE 262 included in the RACF 210 to request the required QoS resources.

Next, the PD-FE 262 included in the RACF 210 communicates with the TRCF 274 included in the access network function 240 to reserve and allocate the resources in the access network needed to support the P2P telephony flow. After the resources are reserved and allocated, a media bearer channel is established over the communication paths 226-227 in the media plane of the IMS/NGN architecture 200*a* between the user terminal 202 and a destination terminal. It is noted that any suitable protocol may be employed to transport the media corresponding to this non-session-based application service over the paths 226-227 after the media bearer channel has been established. The PD-FE 262 then communicates with the PEF 272 included in the access network function 240 to perform QoS functions such as QoS marking, policing, priority handling, etc., for the P2P telephony flow. If the destination terminal is located within the network of another service provider, then the PD-FE 262 included in the RACF 210 can also communicate with a PEF 282 included in a border gateway 230 to perform QoS marking, policing, priority handling, etc., at the network interface. In this way, a communications system that conforms with the IMS/NGN architecture 200*a* can be employed to provide guaranteed or differentiated QoS and/or differentiated service plans for non-session-based application services such as the P2P telephony service.

As discussed above, the ASCF 290 (see FIG. 2*a*) is configured to inspect packet data flows using pattern matching, application level gateways, decryption, behavioral analysis, etc., or any suitable combination thereof, to identify and classify the application service associated with the respective flow. For example, the ASCF 290 can be configured to perform pattern matching using application-specific signature definitions to inspect both unencrypted and encrypted packet data flows. For example, encrypted packet data flows may be associated with application services such as the FILETOPIA file sharing tool, the RODI peer-to-peer file sharing network, or any other suitable encrypted application service that presents a unique pattern in its flow. In addition, the ASCF 290 can employ application level gateways that use application-specific state-machines executable over a series of packet transmissions. Such application level gateways can be employed when a signature string pattern alone is not sufficient to identify and classify an application service. The state-machines employed by the application level gateways can be used to inspect various combinations of packet sequences, packet lengths, payloads, signature strings, packet handshakes, encryption key exchanges, and unique key matches associated with the media payload of a particular application service.

Not only can the ASCF 290 employ application level gateways in conjunction with pattern matching, but it can also employ a combination of pattern matching, application level gateways, and decryption to identify and classify an application service. For example, the ASCF 290 can employ decryption to decrypt a message exchange to derive a signature string pattern. In addition, the ASCF 290 can perform behavioral analysis to identify and classify certain application services having associated flows that exhibit recognizable patterns in multiple packet sequences or exchanges. For example, such patterns may be exhibited in a one-way or two-way data or media communication. Because the ASCF 290 is configured to perform flow-based inspection of packet data, the ASCF 290 can employ various combinations of flow tables, signature matching, state-machines, etc., to identify and classify a particular application service, while assuring that all subsequent packets in flows associated with that service remain associated with the same application classification. It is noted that some or all of these inspection and detection mechanisms can also be employed to identify malicious or abusive traffic, including, but not limited to, denial of service attacks during which resources in the IMS/NGN architecture should not be granted.

In a second illustrative example, a communications system that conforms with the IMS/NGN architecture 200*b* (see FIG. 2*b*) is employed to control and manage a non-session-based application service such as a P2P telephony service, without signaling the IMS service control functions 206 (see FIG. 2*a*). First, at the UE 202 (the user terminal; see FIG. 2*b*), a packet data flow for the P2P telephony service is sent over the path 226 to the transport functions 212 within the transport layer 208. Next, the ASCF 290 inspects the packet data flow to identify and classify the application service associated with the flow. As discussed above, the ASCF 290 can employ pattern matching, application level gateways, decryption, behavioral analysis, and/or any other suitable mechanism or technique for inspecting the packet data flow to identify and classify the associated application service. After the application service has been successfully identified and classified as a P2P telephony service, the PD-FE 292 included in the ASCF 290 communicates with the TRCF 274 included in the access network function 240 to reserve and allocate the QoS resources in the access network that are needed to support the P2P telephony flow. Because the non-session-based application service has been successfully identified and classified as a P2P telephony service, the QoS of this non-session-based service can be controlled and managed on a "per application" basis. After the resources are reserved and allocated, a media bearer channel is established over the paths 226-227 in the media plane of the IMS/NGN architecture 200*b* between the user terminal 202 and a destination terminal. It is noted that any suitable protocol may be employed to transport the media corresponding to this non-session-based application service over the paths 226-227 after the media bearer channel has been established. The PD-FE 292 then communicates with the PEF 272 included in the access network function 240 to perform QoS functions such as QoS marking, policing, priority handling, etc., for the P2P telephony flow. In this way, a communications system that conforms with the IMS/NGN architecture 200*b* can be employed to provide guaranteed or differentiated QoS and/or differentiated service plans for non-session-based application services without signaling the IMS service control functions.

A method of operating a communications system that conforms with the IMS/NGN architecture 200*a* (see FIG. 2*a*) to control and manage a session-based or non-session-based application service is described below with reference to FIGS. 2*a* and 3*a*-3*e*. It is noted that while this method of operating a communications system is described herein as being implemented by the transport functions 212 within the transport layer 208, in one embodiment, this method can be implemented in its entirety by the ASCF 290. As depicted in step 301 (see FIG. 3*a*), at least one packet in a packet data flow is received at the user-to-network interface between the UE 202 and the transport functions 212 included in the transport layer 208 of NGN. For example, the packet may be part of a packet data flow associated with a session-based or non-session-based application service. Next, at the access network functions 240, flow key attributes are extracted from the packet headers to form a flow key, as known in the art (see step 302). The flow key is then looked up in a flow table maintained by the access network functions 240 to determine if the application service is already associated with an active session, as depicted in steps 303-304. Next, a determination is made as to whether a match is found in the flow table for the flow key, as depicted in step 305. If so, the method branches to step 306, in which the packet payload is inspected, at the ASCF 290, to detect an application-specific signature. As depicted in step 307, a determination is then made as to whether the signature has been found. If so, the application service associated with the flow is reclassified based upon the signature match, as depicted in step 308. Otherwise, if the signature was not found, then the packet is processed in accordance with pre-established policy rules for the existing session, as depicted in step 309.

Figure 3A:
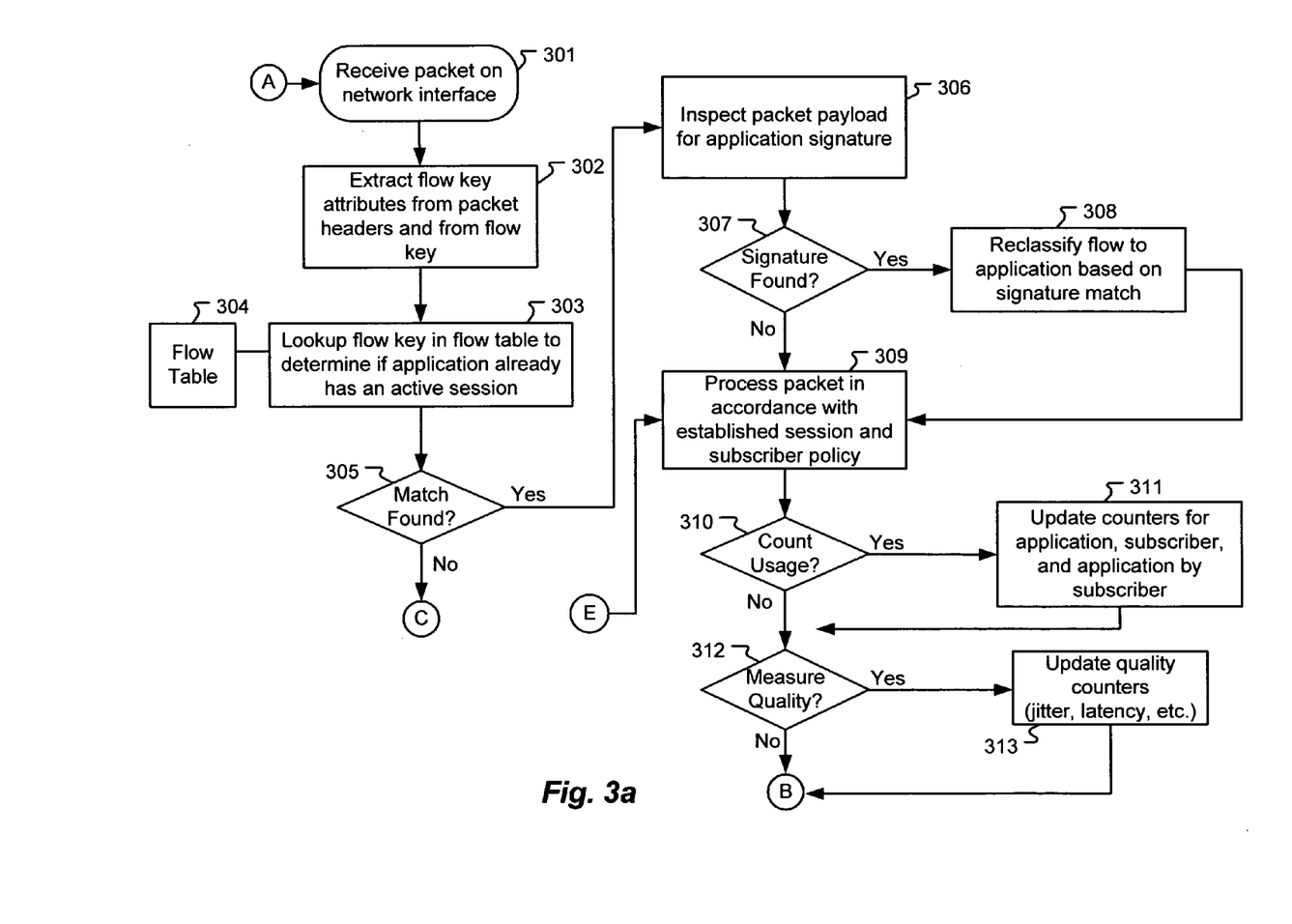

For example, a determination can be made as to whether the policy rules dictate the use of counters, as depicted in step 310. If so, the appropriate counters can be updated for the application and the user/subscriber, as depicted in step 311. In addition, a determination can be made as to whether the policy rules dictate that certain quality parameters be measured, as depicted in step 312. If so, the quality counters (e.g., jitter, latency, etc.) can be updated, as depicted in step 313. In addition, a determination can be made as to whether the policy rules dictate that certain quotas be checked, as depicted in step 314 (see FIG. 3b). If so, usage, time, and event quotas can be checked, and appropriate action can be taken, if necessary, as depicted in step 315. In addition, a determination can be made as to whether the policy rules dictate that the packet be copied, as depicted in step 316. If so, the packet can be copied for lawful intercept or monitoring purposes, as depicted in step 317. In addition, a determination can be made as to whether the packet is to be redirected, as depicted in step 318. If so, the packet can be redirected to a new destination, as depicted in step 319.

Figure 3B:
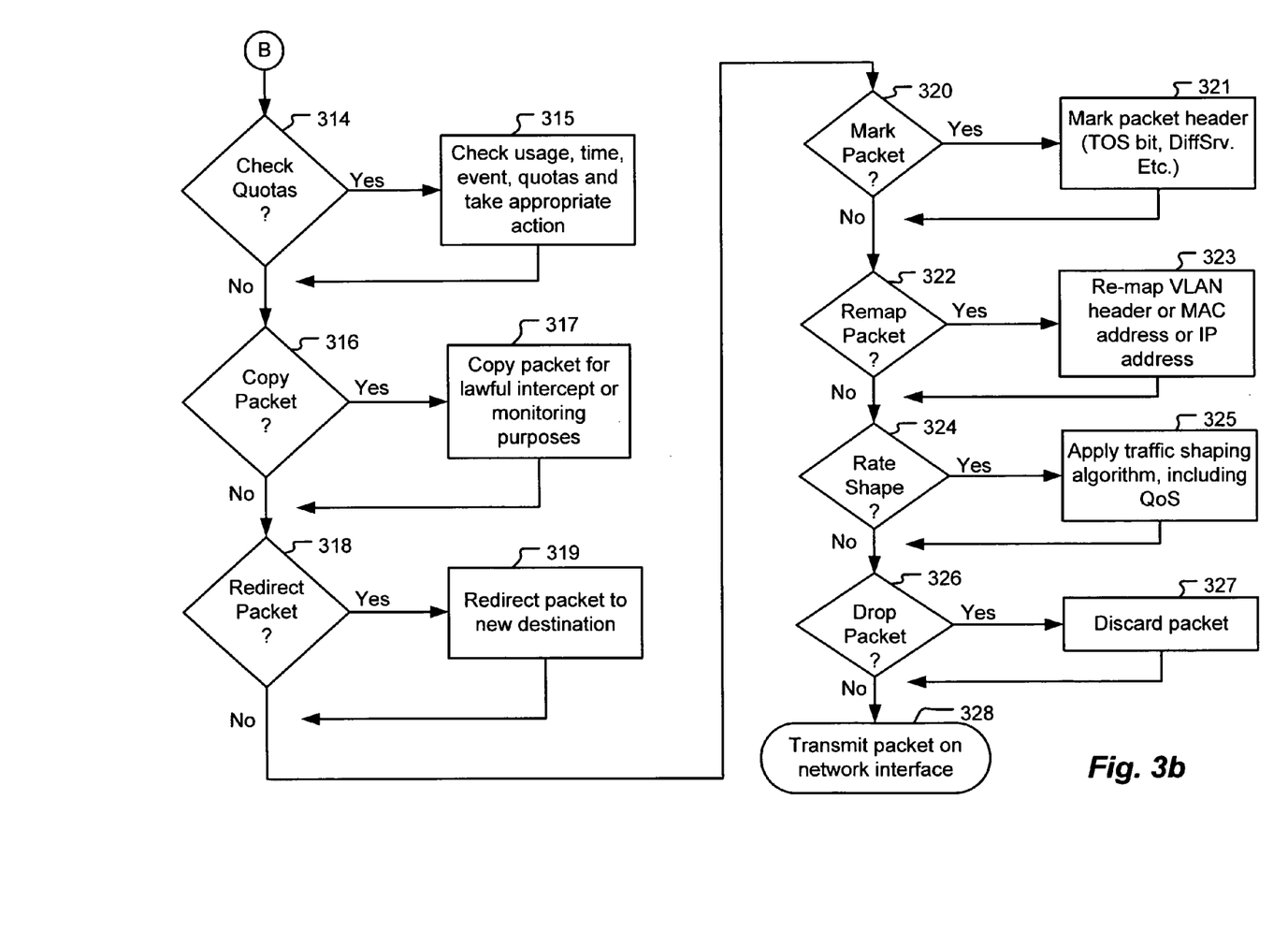
Figure 3C:
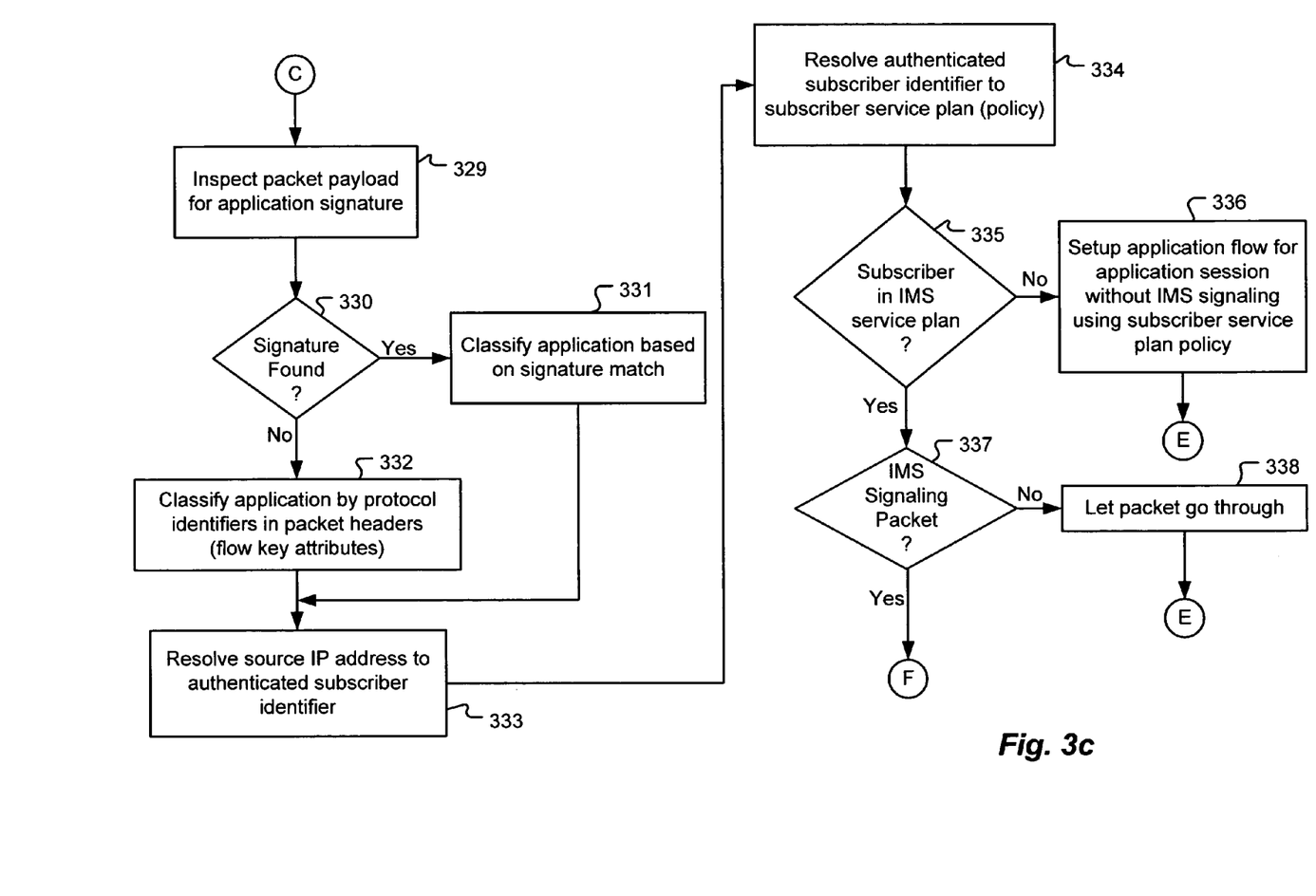

In addition, a determination can be made as to whether the policy rules dictate that the packet be marked, as depicted in step 320. If so, the packet header can be appropriately marked (e.g., TOS bit, DiffSrv, VLAN tag, MPLS label, etc.), as depicted in step 321. In addition, a determination can be made as to whether the policy rules dictate that the packet be remapped, as depicted in step 322. If so, specific fields in the packet headers, such as the VLAN header, the MAC address, or the IP address, can be remapped, as depicted in step 323. In addition, a determination can be made as to whether the policy rules dictate that traffic shaping be applied to the flow, as depicted in step 324. If so, a suitable traffic shaping algorithm can be applied to the flow, as depicted in step 325. In addition, a determination can be made as to whether the packet is to be dropped, as depicted in step 326. If so, the packet can be discarded, as depicted in step 327. After the packet is processed according to the policy rules, the packet can be transmitted over the network-to-network interface between the transport functions 212 within the transport layer 208 of NGN and the border gateway 230, as depicted in step 328.

If no match is found in the flow table for the flow key in step 305, then the method branches to step 329 (see FIG. 3c), in which the packet payload is inspected, at the ASCF 290, to detect an application-specific signature. As depicted in step 330, a determination is then made as to whether the signature has been found. If so, the application service associated with the flow is classified based upon the signature match, as depicted in step 331. Otherwise, if the signature was not found, then the application service associated with the flow is classified based upon protocol identifiers contained in the packet headers (e.g., the flow key attributes), as depicted in step 332. Next, the source IP address is resolved to an authenticated user/subscriber identifier, as depicted in step 333. The authenticated user/subscriber identifier is then resolved to an IMS service plan and policy, as depicted in step 334. Next, a determination is made as to whether or not the user/subscriber is included in the IMS service plan, as depicted in step 335. If not, the packet data flow associated with the application service is setup for processing without signaling the IMS service control functions 206, using a pre-established service plan and policy, as depicted in step 336. Otherwise, if the user/subscriber is included in the IMS service plan, a determination is made as to whether the policy dictates that signaling of the IMS service control functions 206 be performed, as depicted in step 337. If not, the packet is allowed to pass through for subsequent processing according to the pre-established service plan and policy, as depicted in step 338. Otherwise, if the policy requires the signaling of the IMS service control functions 206, then the method branches to step 339 (see FIG. 3d).

Figure 3D:
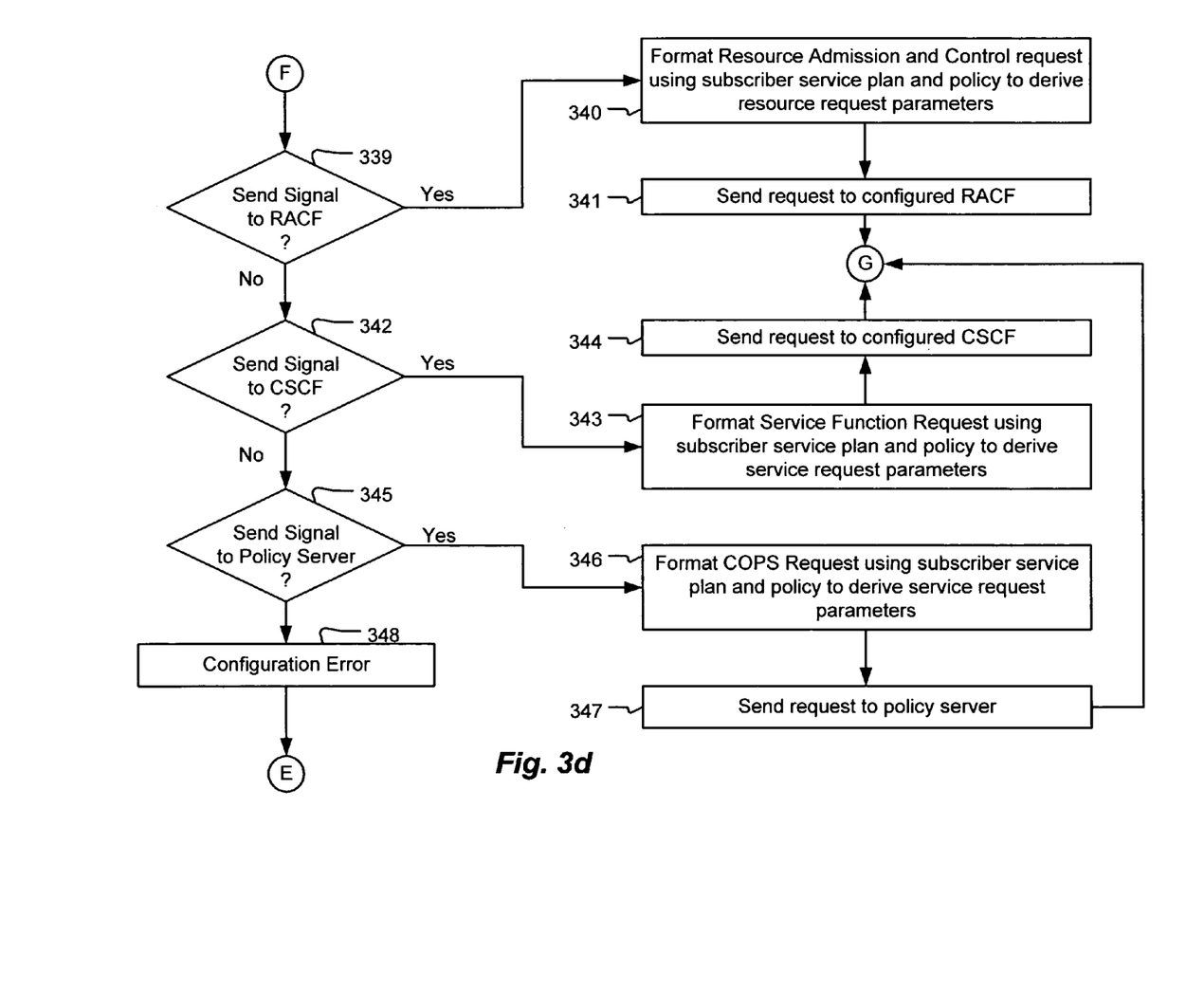

As depicted in step 339, a determination is made as to whether or not the policy requires the ASCF 290 to signal the RACF 210 directly. If so, the ASCF 290 formats a resource admission and control request using the IMS service plan and policy to derive QoS resource request parameters, as depicted in step 340. Next, the ASCF 290 sends the resource admission and control request to the RACF 210, as depicted in step 341, and the method branches to step 349 (see FIG. 3e). Otherwise, if the policy does not require the ASCF 290 to signal the RACF 210, then a determination is made as to whether or not the policy requires the ASCF 290 to signal the CSCF 254, as depicted in step 342. If so, the ASCF 290 formats a service function request using the IMS service plan and policy to derive service request parameters, as depicted in step 343. Next, the ASCF 290 sends the service function request to the CSCF 254, as depicted in step 344, and the method branches to step 349. Otherwise, if the policy does not require the ASCF 290 to signal the CSCF 254, a determination is made as to whether or not the policy requires the ASCF 290 to signal the policy server 264, as depicted in step 345. If so, the ASCF 290 formats a COPS request using the IMS service plan and policy to derive the service request parameters, as depicted in step 346. Next, the ASCF 290 sends the service function request to the policy server 264, as depicted in step 347, and the method branches to step 349. If the policy does not require the ASCF 290 to signal the policy server 264, then a configuration error is generated, as depicted in step 348, and the method branches to step 309.

Figure 3E:
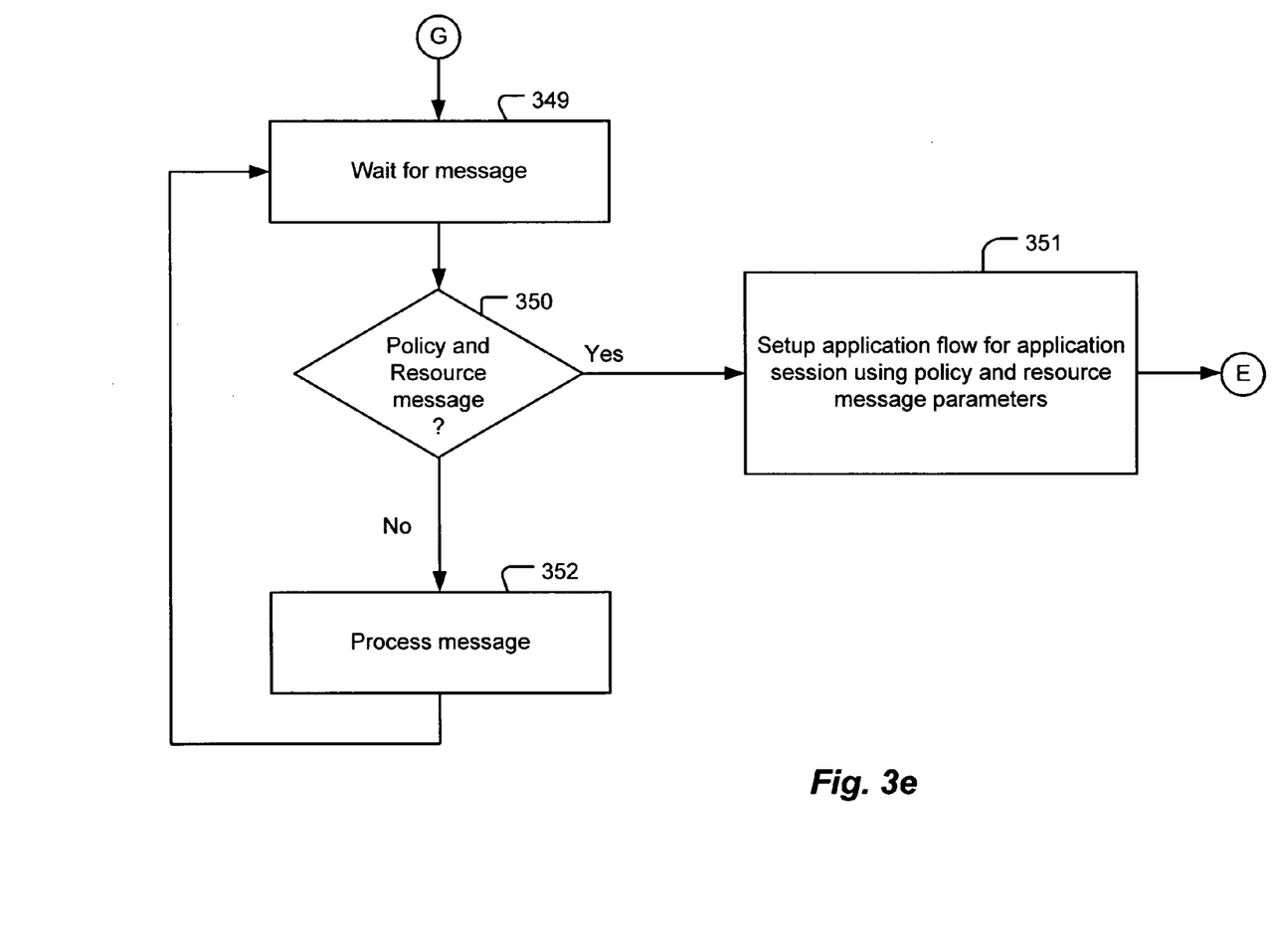

The access network functions 240 then wait for a response message from the RACF 210 or the policy server 264, as depicted in step 349. After a message is received at the access network functions 240, a determination is made as to whether or not the received message corresponds to a policy and resource message, as depicted in step 350. If so, then the access network functions 240 setup their QoS resources in accordance with the parameters contained in the policy and resource message, as depicted in step 351, and the packet is allowed to pass through for subsequent processing according to the IMS service plan and policy. Otherwise, if the received message does not correspond to a policy and resource message, then that message is processed, as depicted in step 352, and the method branches back to step 349 to wait for another message from the RACF 210 or the policy server 264.

By providing a communications system that conforms with the IMS/NGN architecture and incorporates an application service control function (ASCF) as part of the transport functions within the transport layer of NGN, the ASCF can be employed to signal the IMS service control functions in real-time on behalf of non-session-based application services, and to reserve and allocate the quality of service (QoS) resources needed to support packet data flows associated with the non-session-based services. As a result, service providers can provide users or subscribers of such non-session-based services with guaranteed or differentiated QoS and/or differentiated service plans, thereby allowing charges to be calculated for the non-session-based services and service plans that are commensurate with the value of the respective service or plan. In addition, every packet within the IMS/NGN architecture, regardless of whether or not the application service is session-based, can be counted for usage, measured for quality, checked for quotas, copied, redirected, marked, remapped, rate shaped, and/or dropped, as appropriate.

It should be appreciated that each of the functional elements contained in the service layer 204 and the transport layer 208 of the functional architectures 200a, 200b (see FIGS. 2a-2b) of NGN may be embodied as a single computer system or as separate sub-systems, each including one or more processors, program code memory, an operating system, application software, and one or more interfaces for sending and/or receiving packet data flows transported over one or more communications paths within the network.

It will further be appreciated by those of ordinary skill in the art that modifications to and variations of the above-described system and method for controlling non-compliant applications in an IP multimedia subsystem may be made without departing from the inventive concepts disclosed herein. Accordingly, the invention should not be viewed as limited except as by the scope and spirit of the appended claims.

What is claimed is:

1. A method of providing a non-session-based application service within a multimedia communications network, comprising:
   receiving, at a first functional element within said multimedia communications network, a packet data flow at an interface associated with said non-session-based application service;
   inspecting, at said first functional element, said packet data flow with one or more processors to identify a data type associated with said packet data flow, and to determine a classification of said non-session-based application service based at least in part upon said data type;
   establishing a bearer channel with the one or more processors over at least one communications path for transporting said packet data flow within said multimedia communications network; and
   while said data packet flow is being transported over said at least one communications path, processing said packet data flow with the one or more processors to enforce at least one policy rule based at least in part upon said classification of said non-session-based application service.

2. The method of claim 1 wherein said processing with the one or more processors further includes communicating, at said first functional element, with a second functional element within said multimedia communications network to authenticate a user of said non-session-based application service.

3. The method of claim 2 wherein said processing with the one or more processors further includes, in the event said user of said application service is successfully authenticated, sending a message, at said second functional element, to a third functional element within said multimedia communications network to reserve at least one resource in a media plane of said multimedia communications network to support said packet data flow while said packet data flow is being transported over said at least one communications path, said at least on resource having said at least one policy rule associated therewith.

4. The method of claim 3 wherein said processing with the one or more processors further includes, in response to said sending of said message, communicating, at said third functional element, with a fourth functional element within said multimedia communications network to reserve said at least one resource.

5. The method of claim 4 wherein said fourth functional element corresponds to an access network control functional element within said multimedia communications network.

6. The method of claim 3 wherein said third functional element corresponds to a resource and admission control functional element (RACF) within said multimedia communications network.

7. The method of claim 2 wherein said second functional element corresponds to an IP multimedia subsystem (IMS) service control functional element within said multimedia communications network.

8. The method of claim 1 wherein said processing with the one or more processors further includes reserving at least one resource in a media plane of said multimedia communications network to support said packet data flow while said packet data flow is being transported over said at least one communications path, said at least one resource having said at least one policy rule associated therewith.

9. The method of claim 8 wherein said reserving with the one or more processors of said at least one resource includes communicating, at said first functional element, with a second functional element within said multimedia communications network to reserve said at least one resource.

10. The method of claim 9 wherein said second functional element corresponds to an access network control functional element within said multimedia communications network.

11. The method of claim 9 wherein said second functional element corresponds to a resource and admission control functional element (RACF) within said multimedia communications network.

12. The method of claim 1 wherein said processing with the one or more processors of said packet data flow includes performing at least one of:
   updating at least one quality counter for said non-session-based application service;
   checking at least one of a usage quota, a time quota, and an event quota for said non-session-based application service;
   copying at least one packet included in said packet date flow;
   redirecting at least one packet included in said packet data flow;
   marking at least one packet included in the packet data flow;
   remapping at least one specific field contained in at least one header of at least one packet included in said packet data flow;
   processing said packet data flow in accordance with at least one specified traffic shaping algorithm; and
   dropping at least one packet included in said packet data flow.

13. The method of claim 1 wherein said establishing of said bearer channel with the one or more processors includes establishing said bearer channel over said at least one communications path between a user terminal and a destination terminal, said destination terminal being associated with a second network, and wherein said method further includes, while said packet data flow is being transported over said at least one communications path, processing at an interface between said multimedia communications network and said second network, said packet data flow to enforce said at least one policy rule.

14. A system for providing a non-session-based application service within a multimedia communication network, comprising:
   a first functional element within said multimedia communications network, said first functional element being operative to receive a packet data flow at an interface associated with said non-session-based application service, and with one or more processors to inspect said packet data flow to identify a data type associated with said packet data flow, and to determine a classification of said non-session-based application service based at least in part upon said data type;
   at least one second functional element within said multimedia communications network, said at least one second functional element being operative with the one or more processors to establish a bearer channel over at least one communications path for transporting said packet data flow within said multimedia communications network; and
   at least one third functional element within said multimedia communications network, said at least one third functional element being operative, while said packet data flow is being transported over said at least one communications path, to process said packet data flow with the one or more processors to enforce at least one policy rule based at least in part upon said classification of said non-session-based application service.

15. The system of claim 14 wherein said first functional element is further operative with the one or more processors to communicate with a fourth functional element within said multimedia communications network, said fourth functional element being operative, in response to a communication with said first functional element, to authenticate a user of said non-session-based application service.

16. The system of claim 15 wherein said fourth functional element is further operative with the one or more processors, in the event said user of said application service is successfully authenticated, to send a message to a fifth functional element within said multimedia communications network, wherein said fifth functional element is operative, in response to said sending of said message, to reserve said at least one third functional element, said at least one third functional element corresponding to at least one resource in a media plane of said multimedia communications network.

17. The system of claim 16 wherein said fifth functional element corresponds to a resource and admission control functional element (RACF) within said multimedia communications network.

18. The system of claim 15 wherein said fourth functional element corresponds to an IP multimedia subsystem (IMS) service control functional element within said multimedia communications network.

19. The system of claim 14 wherein said first functional element is further operative with the one or more processors to communicate with a fourth functional element within said multimedia communications network, said fourth functional element being operative, in response to a communication with said first functional element, to reserve said at least one third functional element, said at least one third functional element corresponding to at least one resource in a media plane of said multimedia communications network.

20. The system of claim 19 wherein said at least one third functional element corresponds to at least one access network control functional element within said multimedia communications network.

21. The system of claim 19 wherein said fourth functional element corresponds to a resource and admission control functional element (RACF) within said multimedia communications network.

22. The system of claim 14 wherein at least one of said first functional element and said at least one third functional element is further operative with the one or more processors to perform:
   updating at least one quality counter for said non-session-based application service;
   checking at least one of a usage quote, a time quota, and an event quota for said non-session-based application service;
   copying at least one packet included in said packet data flow;
   marking at least one packet included in the packet data flow;
   remapping at least one specific field contained in at least one header of at least one packet included in said packet data flow;
   processing said packet data flow in accordance with at least one specific traffic shaping algorithm; and
   dropping at least one packet included in said packet data flow.

23. A system for providing a non-session-based application service within a multimedia communication network, comprising:
   at least one interface operative to receive at least one packet data flow associated with said non-session based application service, and to send said at least one packet data flow for transport over at least one communications path within said multimedia communication network;
   at least one memory; and
   at least one processor operative to execute at least one program out of said at least one memory:
      to inspect said packet data flow to identify a data type associated with said packet data flow;
      to determine a classification of said non-session-based application service based at least in part upon said data type associated with said packet data flow; and
      to process said packet data flow in accordance with at least one policy rule based at least in part upon said classification of said non-session-based application service.

24. The system of claim 23 wherein said at least one processor is further operative to execute said at least one program out of said at least one memory to communicate with a functional element within said multimedia communications network to reserve at least one resource in a media plane of said multimedia communications network to support said packet data flow while said packet data flow is being transported over said at least one communications path.

25. The system of claim 24 wherein said functional element corresponds to one of an access network control functional element and a resource and admission control functional element (RACF) within said multimedia communications network.

26. The system of claim 23 wherein said at least one processor is further operative to execute said at least one program out of said at least one memory to communicate with a functional element within said multimedia communications network to authenticate a user of said non-session-based application service.

27. The system of claim 26 wherein said functional element corresponds to an IP multimedia subsystem (IMS) service control functional element within said multimedia communications network.

28. The system of claim 23 wherein said at least one processor is further operative to execute said at least one program out of said at least one memory to perform at least one of:
updating at least one quality counter for said non-session-based application service;
checking at least one of a usage quota, a time quota, and an event quota for said non-session based application service;
copying at least one packet included in said packet data flow;
redirecting at least one packet included in said packet data flow;
marking at least one packet included in the packet data flow;
remapping at least on specified field contained in at least one header of at least one packet included in said packet data flow;
processing said packet data flow in accordance with at least one specified traffic shaping algorithm; and
dropping at least one packet included in said packet data flow.

29. A method of operating a communications system to control and manage a session-based or non-session-based application services, the method comprising:
receiving at least one data packet at a user-to-network interface;
extracting, with one or more processors, flow key attributes from a header of the at least one data packet to form a flow key;
determining, with the one or more processors, if the application service is associated with an active session by looking up said flow key in a flow table;
if a match is found in the flow table for the flow key, then inspecting the at least one data packet to determine if an application-specific signature is found;
if the application-specific signature is found, then reclassifying the application service based upon the signature match, otherwise processing the data packet with pre-established policy rules;
if no match is found in the flow table for the flow key, then inspecting the at least one data packet to determine if the application-specific signature is found;
if the application-specific signature is found, then classifying the application service based on the signature match, otherwise classifying the application service based on protocol identifiers contained in the header of the at least one data packet; and
establishing a bearer channel with the one or more processors over at least one communications path for transporting said at least one data packet within said communications system.

30. The method of claim 29 further comprising:
resolving, with the one or more processors, a source IP address to an authenticated user identifier;
resolving, with the one or more processors, the authenticated user identifier to a subscriber service plan;
determining whether a user is subscribed to an IMS plan; and
determining whether IMS control functions will be performed.

* * * * *